(12) United States Patent
Hong et al.

(10) Patent No.: US 12,039,357 B2
(45) Date of Patent: Jul. 16, 2024

(54) MECHANISM FOR DISTRIBUTED RESOURCE-BASED I/O SCHEDULING OVER STORAGE DEVICE

(71) Applicant: Samsung Electronics Co., Ltd., Suwon-si (KR)

(72) Inventors: Ilgu Hong, Santa Clara, CA (US); Yang Seok Ki, Palo Alto, CA (US); Changho Choi, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 611 days.

(21) Appl. No.: 17/349,675

(22) Filed: Jun. 16, 2021

(65) Prior Publication Data

US 2022/0342689 A1 Oct. 27, 2022

Related U.S. Application Data

(60) Provisional application No. 63/179,082, filed on Apr. 23, 2021.

(51) Int. Cl.
*G06F 9/455* (2018.01)
*G06F 3/06* (2006.01)
*G06F 9/48* (2006.01)

(52) U.S. Cl.
CPC .......... *G06F 9/45558* (2013.01); *G06F 3/061* (2013.01); *G06F 3/0631* (2013.01);
(Continued)

(58) Field of Classification Search
CPC ... G06F 2009/4557; G06F 2009/45579; G06F 2009/45575; G06F 2009/45583;
(Continued)

(56) References Cited

U.S. PATENT DOCUMENTS 7,694,082 B2  4/2010  Golding et al.
7,739,418 B2  6/2010  Elkington et al.
(Continued)

FOREIGN PATENT DOCUMENTS

EP        3608769 A1        2/2020
KR   10-2017-0011350 A     2/2017
WO      2021/011920 A1      1/2021

OTHER PUBLICATIONS

Korean Office Action for KR Application No. 10-2022-0030791 dated Dec. 13, 2023, 5 pages.
(Continued)

*Primary Examiner* — Brian W Wathen
(74) *Attorney, Agent, or Firm* — Lewis Roca Rothgerber Christie LLP

(57) ABSTRACT

A system for scheduling input/output (I/O) requests from virtual machines includes a storage device including storage device resources for processing I/O requests to access a non-volatile memory of the storage device, a first virtual machine configured to send an I/O request to the storage device, a resource manager configured to calculate a first amount of the storage device resources and assign the first amount to the first virtual machine, and a traffic controller associated with the first virtual machine, the traffic controller being configured to reschedule the I/O request from the first virtual machine based on an availability of the first amount.

20 Claims, 4 Drawing Sheets

(52) U.S. Cl.
CPC .......... *G06F 3/0679* (2013.01); *G06F 9/4881* (2013.01); *G06F 2009/4557* (2013.01); *G06F 2009/45579* (2013.01)

(58) Field of Classification Search
CPC ...... G06F 3/061; G06F 3/0631; G06F 3/0679; G06F 3/0653; G06F 3/0659; G06F 3/0611; G06F 3/067
See application file for complete search history.

(56) References Cited

U.S. PATENT DOCUMENTS

| | | | |
|---|---|---|---|
| 7,797,699 | B2 | 9/2010 | Kagi et al. |
| 8,424,014 | B2 | 4/2013 | Auernhammer et al. |
| 10,838,890 | B2 | 11/2020 | Huang et al. |
| 11,797,197 | B1* | 10/2023 | Karr .................. G06F 3/0614 |
| 2005/0198632 | A1* | 9/2005 | Lantz .................. G06F 9/45558 718/1 |
| 2016/0019176 | A1* | 1/2016 | Challa .................. G06F 9/45558 710/117 |
| 2017/0024132 | A1 | 1/2017 | Jun et al. |
| 2018/0088978 | A1* | 3/2018 | Li .................. G06F 9/45558 |
| 2018/0321985 | A1* | 11/2018 | Kakaiya .................. G06F 9/545 |
| 2019/0155548 | A1 | 5/2019 | Jia et al. |
| 2020/0097183 | A1 | 3/2020 | Rawal et al. |
| 2020/0127938 | A1 | 4/2020 | Duarte et al. |
| 2020/0287837 | A1 | 9/2020 | Meng et al. |
| 2021/0004163 | A1* | 1/2021 | Xu .................. G06F 3/065 |
| 2022/0083395 | A1* | 3/2022 | McQuighan .............. G06T 1/20 |
| 2022/0121367 | A1* | 4/2022 | Agarwal .................. G06F 3/0688 |

OTHER PUBLICATIONS

EPO Extended European Search Report dated Sep. 28, 2022, issued in corresponding European Application No. 22166492.3 (10 pages).

* cited by examiner

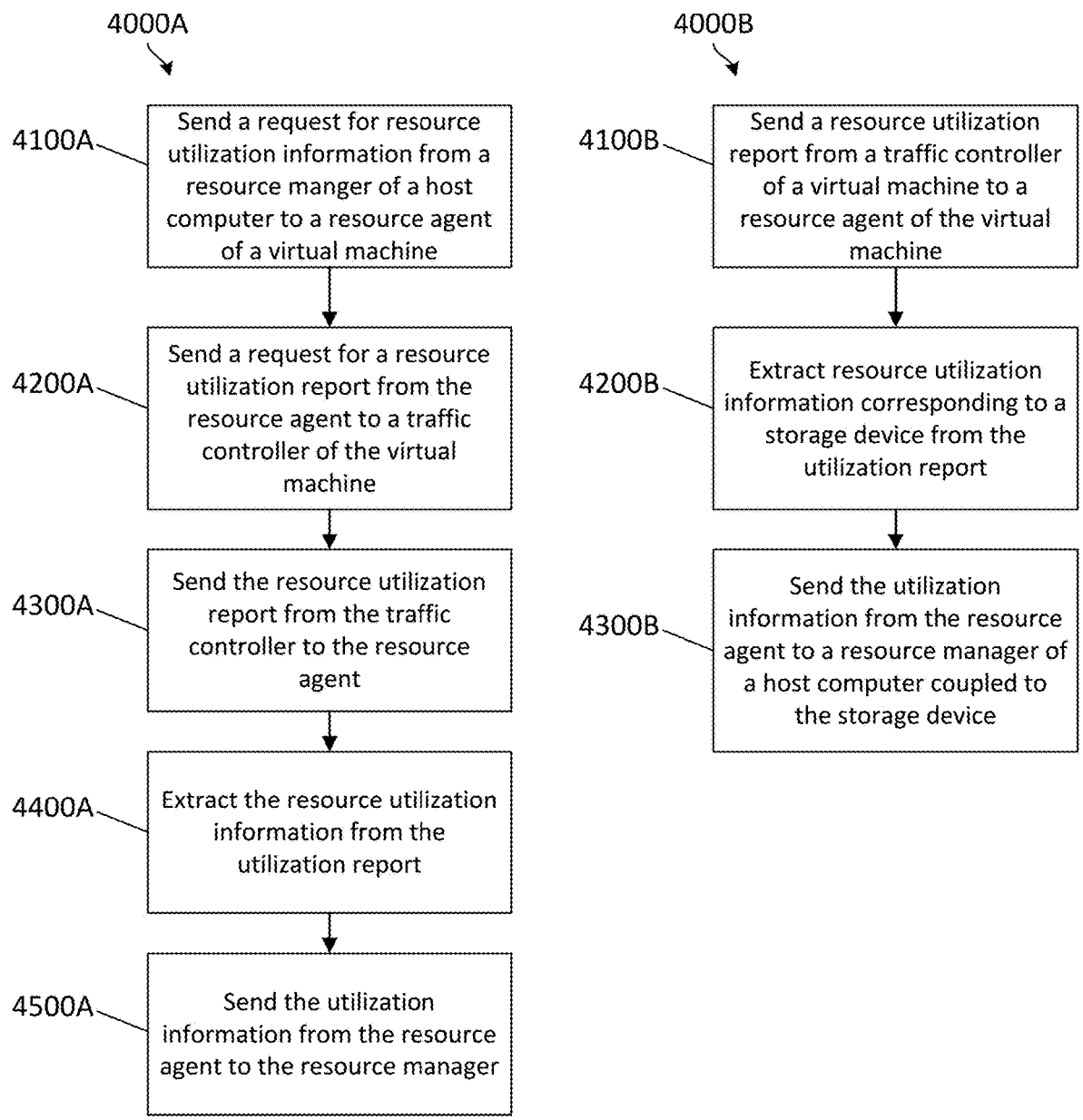

MECHANISM FOR DISTRIBUTED RESOURCE-BASED I/O SCHEDULING OVER STORAGE DEVICE

CROSS-REFERENCE TO RELATED APPLICATION(S)

The present application claims priority to, and the benefit of, U.S. Provisional Application No. 63/179,082, filed Apr. 23, 2021, entitled "RESOURCE-BASED 10 SCHEDULING OVER SR-IOV (SINGLE ROOT I/O VIRTUALIZATION) STORAGE DEVICE," the entire content of which is incorporated herein by reference.

FIELD

Aspects of some embodiments of the present disclosure relate to storage devices, and more particularly, to systems and methods of scheduling input/output (I/O) requests from virtual machines to a storage device based on an assignment of storage device resources.

BACKGROUND

In the field of computing, virtualization may refer to the use of software to distribute and isolate the physical resources of a host computer system for use by any number of virtual guest computers, called "virtual machines," loaded onto the host computer system. A virtual machine may provide I/O requests (e.g., read and write commands) for processing by a storage device associated with the host computer system. However, in some situations (e.g., due to resource conflicts with other virtual machines), there may not be enough storage device resources available to process the I/O requests, resulting in performance reduction including increased I/O latency.

Accordingly, there is a need for a system and method of resource-based scheduling of I/O requests for processing by a storage device that provides for a controlled and fair distribution of storage device resources.

SUMMARY

Aspects of embodiments of the present disclosure relate to computing and virtualization, and provide improvements to systems including virtual machines configured to send I/O requests to storage devices in accordance with a protocol (e.g., SR-IOV) that allows the I/O requests to bypass a host software stack of a host computer.

According to some embodiments of the present disclosure, there is provided a system for scheduling input/output (I/O) requests from virtual machines, the system including a storage device including storage device resources for processing I/O requests to access a non-volatile memory of the storage device, a first virtual machine configured to send an I/O request to the storage device, a resource manager configured to calculate a first amount of the storage device resources and assign the first amount to the first virtual machine, and a traffic controller associated with the first virtual machine, the traffic controller being configured to reschedule the I/O request from the first virtual machine based on an availability of the first amount.

The system may further include a resource agent associated with the first virtual machine, the resource agent being configured to communicate, between the first virtual machine and the resource manager, resource assignment information, resource utilization information, or information corresponding to I/O statistics.

The system may further include sending the I/O request from the first virtual machine to the storage device resources in accordance with a protocol that allows the I/O request to bypass a host software stack of the system.

The protocol may include a single root I/O virtualization (SR-IOV) protocol and the first virtual machine may be configured to send the I/O request to the storage device via a virtual function of the first virtual machine.

The storage device resources may include hardware queues and hardware tokens to keep track of a command processing status of one or more I/O requests, and the storage device may be configured to send, to a host computer, a storage device resource information that is indicative of a total amount of the storage device resources.

The resource manager may calculate the first amount based on a storage device resource information, a parameter corresponding to a service level of the first virtual machine, and a parameter associated with a loading of the first virtual machine onto the system.

The system may further include recalculating, by the resource manager, the first amount based on a parameter associated with a loading or an unloading of a second virtual machine onto the system.

The resource manager may calculate the first amount based on a relative service level weight of the first virtual machine, a resource allocation unit, a total amount of the storage device resources, and a relative service level weight of a second virtual machine associated with the system.

The traffic controller may track a resource collision statistic corresponding to the rescheduling of the I/O request from the first virtual machine.

The traffic controller may be configured to report information corresponding to the resource collision statistic to the resource manager.

According to other embodiments of the present disclosure, there is provided a method of scheduling input/output (I/O) requests from virtual machines, the method including loading a first virtual machine to a system, calculating, by a resource manager, a first amount of storage device resources, assigning, by the resource manager, the first amount to the first virtual machine, notifying a traffic controller, associated with the first virtual machine, of the first amount, determining that an amount of storage device resources required to process an I/O request from the first virtual machine is greater than an amount of storage device resources available to process the I/O request based on the first amount, and rescheduling, by the traffic controller, the I/O request.

The notifying the traffic controller may include notifying a resource agent associated with the first virtual machine, the resource agent being configured to communicate, between the first virtual machine and the resource manager, resource assignment information, resource utilization information, or information corresponding to I/O statistics.

The method may further include sending the I/O request to the storage device resources based on determining that the amount of storage device resources required to process the I/O request is less than or equal to the amount of storage device resources available to process the I/O request, wherein the storage device resources include one or more queues for processing I/O requests to access a non-volatile memory of a storage device, and wherein the first virtual machine is configured to send the I/O request to the storage device in accordance with a protocol that allows the I/O request to bypass a host software stack of the system.

The protocol may include a single root I/O virtualization (SR-IOV) protocol and the first virtual machine may be configured to send the I/O request to the storage device via a virtual function of the first virtual machine.

The resource manager may calculate the first amount based on a storage device resource information, a parameter corresponding to a service level of the first virtual machine, and parameter associated with a loading of the first virtual machine onto the system.

The method may further include recalculating, by the resource manager, the first amount of storage device resources assigned to the first virtual machine based on a parameter associated with a loading or a parameter associated with an unloading of a second virtual machine onto the system.

The resource manager may calculate the first amount of storage device resources based on a relative service level weight of the first virtual machine, a resource allocation unit, a total amount of storage device resources, and a relative service level weight of a second virtual machine associated with the system.

The method may further include tracking, by the traffic controller, a resource collision statistic corresponding to the rescheduling of the I/O request.

According to other embodiments of the present disclosure, there is provided a system including a host computer, and a non-transitory computer readable medium, the non-transitory computer readable medium being implemented on the host computer and having computer code that, when executed on a processor, implements a method of scheduling input/output (I/O) requests from virtual machines, the method including loading a first virtual machine to the system, calculating, by a resource manager, a first amount of storage device resources, assigning, by the resource manager, the first amount to the first virtual machine, notifying a traffic controller, associated with the first virtual machine, of the first amount, determining that an amount of storage device resources required to process an I/O request from the first virtual machine is greater than an amount of storage device resources available to process the I/O request based on the first amount, and rescheduling, by the traffic controller, the I/O request.

The notifying the traffic controller may include notifying a resource agent associated with the first virtual machine, the resource agent being configured to communicate, between the first virtual machine and the resource manager, resource assignment information, resource utilization information, or information corresponding to I/O statistics.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 4 is a flowchart depicting example operations of methods of communicating resource utilization information between a resource manager and a traffic controller of the system of FIG. 1, according to some embodiments of the present disclosure.

Figure 1:
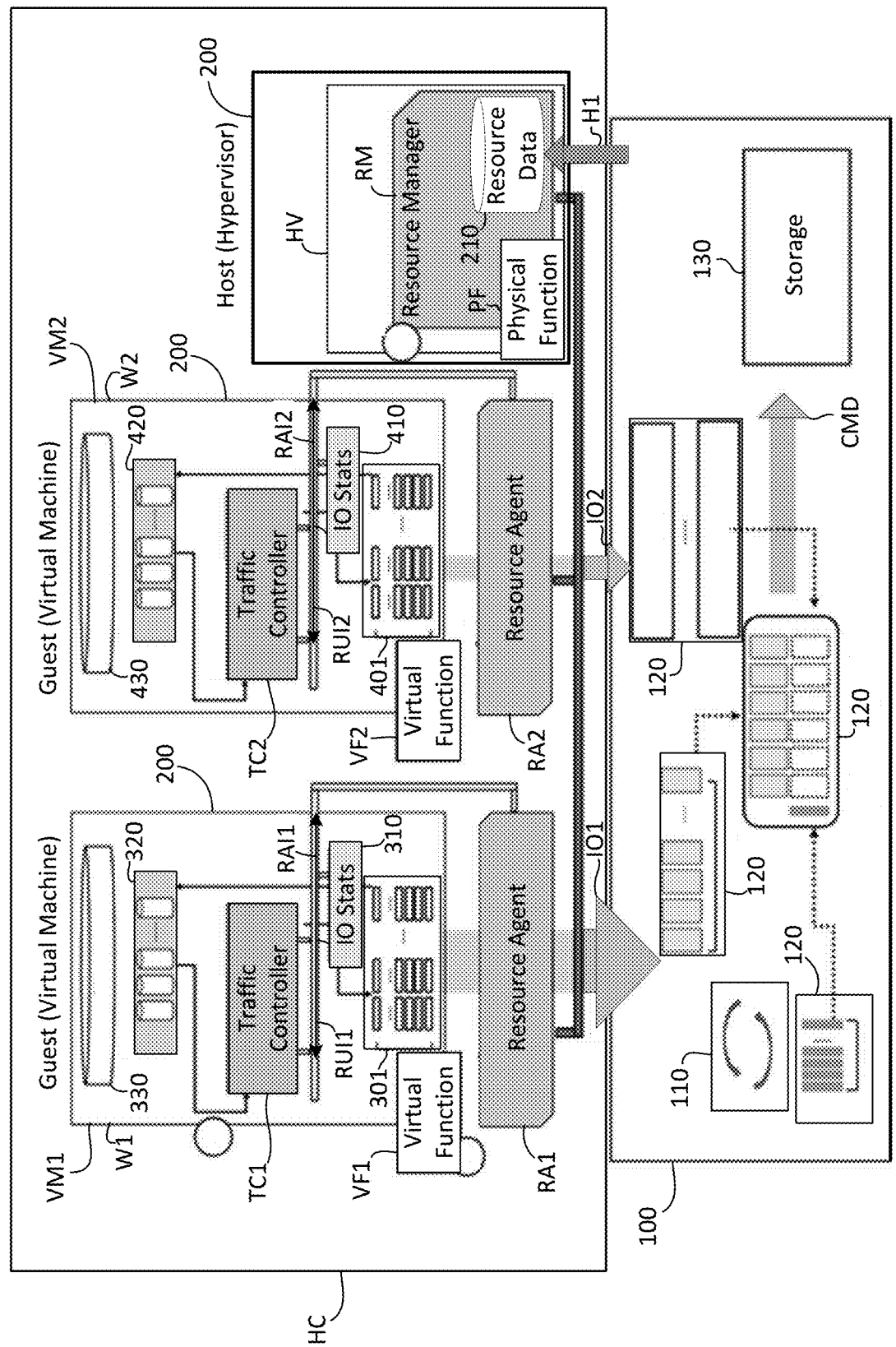
FIG. 1 is a system diagram depicting a system for scheduling input/output (I/O) requests from virtual machines, according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are example operations, and may involve various additional operations not explicitly covered, and (ii) the temporal order of the operations may be varied.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of computing, virtualization may refer to the use of software to distribute and isolate the physical resources of a host computer system (e.g., host computer) for use by any number of virtual guest computers, called "virtual machines" ("VMs"), loaded onto the host computer. Users of the virtual machines need not be aware of one another and may have a user experience similar to that of using dedicated local computer resources, even though the resources provided to each virtual machine may be distributed, shared remote resources.

Single Root I/O Virtualization ("SR-IOV") is a technique that provides isolated virtual device resources to a virtual machine through a virtual function ("VF"). For example, a hypervisor of a host computer may create a virtual device with a virtual function and expose (e.g., provide) the virtual device to a virtual machine. Through the virtual function, the virtual machine may send input/output (I/O) requests directly to a storage device (e.g., a solid state drive (SSD)). That is, the SR-IOV technique allows the virtual machine to bypass a host software stack of the host computer to access data from a storage device (or multiple storage devices), which may reduce latency and improve performance.

Although each virtual function has its own dedicated resources (e.g., Peripheral Component Interconnect configuration space (or PCI config) and Base Address Register (or BAR)), each virtual machine may, nonetheless, share limited internal resources of a storage device (e.g., storage device resources for processing I/O requests to access a non-volatile memory of the storage device) with other virtual machines. Thus, even in an SR-IOV (or similar) environment, uncontrolled I/O traffic and uncontrolled I/O bandwidth among virtual machines operating on a host computer system may result in significantly increased I/O latency, decreased responsiveness, and overall performance degradation for all of the virtual machines associated with a host computer due to internal storage device resource conflict between the virtual machines.

Furthermore, such uncontrolled I/O traffic may result in unfair resource distribution. For example, a virtual machine associated with a higher level of service (e.g., a quality of service (QoS)) may be forced to wait for storage device resources to be released by another virtual machine associated with a lower level of service, resulting in an unfair latency increasing of the virtual machine associated with the higher level of service.

Although a hypervisor (e.g., a virtual machine monitor that creates and runs the virtual machines of a host computer), operating alone, may be used to reduce some I/O performance degradation problems by isolating I/O performance based on a level of service (e.g., a QoS or a service level of a service level agreement (SLA) for computation power), such an approach may still be significantly limited in some systems. For example, some embodiments may use a hypervisor corresponding to a host software stack to assign dedicated central processing units (CPUs) and memory for the virtual machines. However, such embodiments may not address I/O request latencies because virtual machines with SR-IOV may bypass the host software stack (e.g., the host operating system (OS)) to access data from storage devices (e.g., a plurality of distributed storage devices). Thus, the host software stack may not be available to provide scheduling of such I/O requests, making it difficult to provide resource-based I/O scheduling in an SR-IOV, or similar, environment. For example, I/O virtual address (or IOVA) to physical address translation may be supported by an input-output memory management unit (IOMMU) to allow the virtual machines to bypass the host software stack.

According to aspects of embodiments of the present disclosure, a system for scheduling I/O requests from virtual machines may allow I/O requests from virtual machines to be scheduled and controlled at each respective virtual machine based on a relative service level of each virtual machine and based on dynamic resource assignment information provided to and stored at each respective virtual machine.

The system may provide a mechanism to isolate I/O performance based on a level of service (e.g., a QoS or a service level of a service level agreement (SLA)), such that storage device resources are assigned to the virtual machines based on relative service levels of the virtual machines for a fair distribution of resources. For example, a level of service may be provided to a virtual machine to guarantee that a maximum latency will be less than an agreed-upon latency for the service level or that a minimum throughput will be greater than an agreed-upon throughput for the service level.

Resource assignment information for the system may be dynamically provided to each virtual machine by a resource manager (e.g., host resource management logic) of the system. For example, the resource manager may update resource assignment information based on a loading or an unloading of a virtual machine among the virtual machines (e.g., based on a parameter or parameters associated with a loading or an unloading of a virtual machine). The resource manager may update the resource assignment information by using a formula for calculating a weighted share of resources for each virtual machine and communicating the updated resource assignment information to each virtual machine. As used herein, a "resource manager" is a software component that runs on a system for scheduling I/O requests from virtual machines (e.g., on a host operating system portion of the system) and that determines what resources will be allocated to each of a plurality of virtual machines.

Accordingly, storage device I/O request processing resources may be shared by each virtual machine in proportion to each virtual machine's respective service level. Furthermore, each virtual machine's I/O requests may be directed from the virtual machine to the virtual machine's available assigned I/O request processing resources via distributed traffic controllers of the system, rather than via a centralized scheduler of a host software stack.

In some embodiments, a system for scheduling I/O requests from virtual machines to one or more storage devices may include a mechanism (e.g., a communication mechanism) and/or a framework (e.g., an architecture) to provide for communication between a host operating system and a guest operating system. The mechanism allows for distribution of internal storage device resources for processing the I/O requests in an environment where the virtual machines are configured to send the I/O requests to the storage device in accordance with a protocol (e.g., an SR-IOV protocol) that allows the I/O request to bypass a host software stack of a host computer. Accordingly, the system provides advantages and performance improvements including decreased latency and increased throughput in SR-IOV, or similar, environments by still allowing I/O requests to bypass the host software stack while improving access to and an availability of (e.g., a guaranteed availability of) internal storage device resources for processing requests to access a non-volatile memory of the storage device.

FIG. 1 is a system diagram depicting a system for scheduling input/output (I/O) requests from virtual machines, according to some embodiments of the present disclosure.

Referring to FIG. 1, a system 1 for scheduling I/O requests from virtual machines may include a host computer HC (e.g., a host computer system) and a storage device 100 (e.g., a storage device supporting SR-IOV). While the storage device 100 is shown as being separate from the host computer HC, the present disclosure is not limited thereto. For example, the storage device 100 may be a component of the host computer HC.

The storage device 100 may include a non-volatile memory 130 (e.g., a NAND flash or backend NVM medium), a command dispatcher and algorithm 110 (e.g., a round-robin scheduling policy), and storage device resources 120 (e.g., storage device resources for processing I/O requests to access the non-volatile memory 130 of the storage device 100). The storage device resources 120 may include (e.g., be) a limited amount of shared hardware resources for processing I/O requests from the host computer HC.

The storage device 100 may provide the storage device resources 120 to process I/O requests corresponding to a first I/O request stream 101 to access the non-volatile memory 130 of the storage device 100 and a second I/O request stream 102 to access the non-volatile memory 130 of the storage device 100. The non-volatile memory 130 may be accessed via a read or write command CMD from the storage device resources 120. The storage device resources 120 may include hardware tokens, hardware queues, hardware direct memory access (DMA) descriptors, and/or hardware buffers. The storage device resources 120 may be used to keep track of a command processing status for each I/O request. The storage device resources 120 may be assigned for each I/O request to move data between the host computer HC and the non-volatile memory 130. The storage device resources 120 may be limited resources for processing I/O requests to access the non-volatile memory 130 of the storage device 100. The storage device 100 may be configured to send (e.g. transmit or propagate) storage device resource information H1 (e.g., information that is indicative of a total amount of the storage device resources 120 and/or an availability of the storage device resources 120) to the host computer HC.

The host computer HC may include hardware and software. The hardware of the host computer HC may include a central processing unit (CPU), a random access memory (RAM), a storage, and peripheral devices. The software of the host computer HC may include a host software stack 200, which may include a hypervisor HV, a first virtual machine VM1, and a second virtual machine VM2.

The host software stack 200 may include a host filesystem, a host volume driver, a host disk driver, and a host storage driver. The first virtual machine VM1 and the second virtual machine VM2 may each include a virtual machine software stack. Each virtual machine software stack may include a VM filesystem, a VM volume driver, a VM disk driver, and a VM storage driver.

In some embodiments, each virtual machine software stack may be built over a filesystem of the host OS, such that I/O requests from a virtual machine VM to a storage device 100 may not bypass a host software stack to access the storage device 100. For example, a virtual machine VM may send an I/O request to the storage device 100 of a host system, such that the I/O request may be directed along the following I/O path: (1) the VM filesystem, (2) the VM volume driver, (3) the VM disk driver, (4) the VM storage driver, (5) the host filesystem, (6) the host volume driver, (7) the host disk driver, (8) the host storage driver, and (9) the storage device.

In some embodiments, a virtual machine VM may be configured to send an I/O request to a storage device 100 in accordance with a protocol (e.g., an SR-IOV protocol) that allows the I/O request to bypass a host software stack. For example, a virtual machine VM may send the I/O request to the storage device 100, such that the I/O request may be directed along the following I/O path: (1) the VM filesystem, (2) the VM volume driver, (3) the VM disk driver, (4) the VM storage driver, and (5) the storage device (through a virtual function VF). In such embodiments, an IOMMU may allow for direct memory access in an address space of the virtual machine VM to allow the I/O request to bypass the host software stack to access the storage device 100.

The host computer HC may be coupled to (e.g., connected to) the storage device 100 via a Peripheral Component Interconnect (PCI) device. PCI functions, associated with PCI devices, known as a physical functions PF and virtual functions VF are used in SR-IOV environments to enable a virtual machine VM to send an I/O request to a storage device 100 while bypassing a host software stack. Generally, a physical function PF supports a full feature set of functionality of a PCI device and a virtual function VF provides a lightweight feature set of functionality of the PCI device (e.g., data movement). One or more virtual functions VF may be associated with a physical function PF. A hypervisor HV may assign a virtual function VF device to a virtual machine VM when configuring the virtual machine VM.

In some embodiments, the first virtual machine VM1 may include a first filesystem 330, a first software queue and I/O scheduler 320, and a first virtual function VF1. Likewise, the second virtual machine VM2 may include a second filesystem 430, a second software queue and I/O scheduler 420, and a second virtual function VF2.

In some embodiments, the first virtual machine VM1 may have (e.g., may be assigned) a first parameter W1 corresponding to a service level (e.g., a relative service level) of the first virtual machine VM1, and the second virtual machine VM2 may have (e.g., may be assigned) a second parameter W2 corresponding to a service level (e.g., a relative service level) of the second virtual machine VM2. For example, the first parameter W1 and the second parameter W2 (collectively, the service level parameters W1 and W2) may correspond to a QoS or a service level agreement (SLA) of their respective virtual machines. For example, the service level parameters W1 and W2 may correspond to a price and/or a performance characteristic (e.g., a requirement) of their respective virtual machine VM. By assigning an amount (e.g., a quantity or a percentage) of storage device resources 120 to the first virtual machine VM1 and the second virtual machine VM2 based on the first parameter W1 and the second parameter W2, the storage device resources 120 may be distributed fairly to the first virtual machine VM1 and the second virtual machine VM2, such that a relative service level of the first virtual machine VM1 and the second virtual machine VM2, corresponding to an amount and/or an availability of the storage device resources 120, may be honored (e.g., guaranteed).

In some embodiments, the first parameter W1 and the second parameter W2 may correspond to a respective service level weight of the first virtual machine VM1 and the second virtual machine VM2. For example, the first virtual machine VM1 may be assigned a weight of 3 (e.g., W1=3) when it is loaded onto the host computer HC based on a service level of the first virtual machine VM1, and the second virtual machine VM2 may be assigned a weight of 1 (e.g., W2=1) when it is loaded onto the host computer HC based on a relative service level of the second virtual machine VM2. The weight of 3 may correspond to a higher service level than the weight of 1.

In some embodiments, a calculation may be made to determine an amount of the storage device resources 120 to assign respectively to any number of virtual machines VM loaded onto the host computer HC. For example, referring to Equation 1 (below), SLA weight (VM) may correspond to a service level weight (e.g., a relative service level weight) of a given virtual machine VM and $\Sigma$ SLA weight (VM) may correspond to a sum of service level weights (e.g., relative service level weights) of all of the virtual machines VM loaded onto the host computer HC. The respective service level weights of each virtual machine VM may be used to determine an amount of the storage device resources 120 to assign respectively to any number of virtual machines VM loaded onto the host computer HC by determining (e.g., calculating) (a) a resource allocation unit and (b) an amount of assigned resources for a given VM according to Equation 1 (below).

(a) resource allocation unit=total amount of resources/$\Sigma$SLA weight (VM)

(b) amount of assigned resources for a given VM=SLA weight (VM)×resource allocation unit     Equation 1

In some embodiments, the system 1 may calculate an amount of assigned resources for each virtual machine VM of the host computer HC based on a service level corresponding to a QoS or an SLA when any given virtual machine VM is loaded or unloaded by the hypervisor HV.

As mentioned above, in some embodiments, the system 1 may include an overall architecture to provide for communication between the host operating system and guest operating systems (e.g., the first virtual machine VM1 and the second virtual machine VM2) for distribution (e.g., assignment) of the internal storage device resources 120 in an environment where the first and second virtual machines VM1 and VM2 are configured to send I/O requests to the storage device 100 in accordance with a protocol (e.g., an SR-IOV protocol) that allows the I/O requests corresponding to the first and second I/O request streams 101 and 102 to bypass the host software stack 200 of the host computer HC. The overall architecture of the system 1 may include one or more traffic controllers TC, one or more resource agents RA, and a resource manager RM. Each traffic controller TC and each resource agent RA may correspond to a respective one of one or more virtual machines VM loaded onto the host computer HC. The resource manager RM may correspond to a hypervisor HV of the host computer HC.

Although aspects of embodiments of the present disclosure may be described as including virtual machines VM and a resource manager RM located at a host computer HC. The present disclosure is not limited thereto. For example, in some embodiments, a virtual machine VM and/or a resource manager RM may be located at a same storage device, at different storage devices, at a host, or at a combination of host and storage device locations.

The system 1 may include a first traffic controller TC1 corresponding to (e.g., associated with) the first virtual machine VM1. The first traffic controller TC1 may be included in a software stack of the first virtual machine VM1. The system 1 may include a second traffic controller TC2 corresponding to (e.g., associated with) the second virtual machine VM2. The second traffic controller TC2 may be included in a software stack of the second virtual machine VM2. The system 1 may include a first resource agent RA1 corresponding to (e.g., associated with) the first virtual machine VM1. The first resource agent RA1 may be included in the software stack of the first virtual machine VM1. The system 1 may include a second resource agent RA2 corresponding to (e.g., associated with) the second virtual machine VM2. The second resource agent RA2 may be included in the software stack of the second virtual machine VM2. The system 1 may include a resource manager RM. The resource manager RM may correspond to (e.g., be associated with) the hypervisor HV of the host computer HC (e.g., the resource manager RM may be the hypervisor HV or may be a sub module of the hypervisor HV).

In some embodiments, the first virtual machine VM1 may include first virtual storage device resources 301 (over the first virtual function VF1). The first virtual machine VM1 may receive and store a first resource utilization information RUI1 and a first resource assignment information RAI1. The first virtual machine VM1 may update and store first I/O statistics 310. Likewise, the second virtual machine VM2 may include second virtual storage device resources 401 (over the second virtual function VF2). The second virtual machine VM2 may receive and store a second resource utilization information RUI2 and a second resource assignment information RAI2. The second virtual machine VM2 may update and store second I/O statistics 410.

In some embodiments, the resource manager RM may receive, store, update, and propagate (e.g., send or transmit) resource data 210 corresponding to the storage device 100 (or a plurality of storage devices). For example, the resource manager RM may receive the storage device resource information H1 from the storage device 100 (e.g., through a vendor-specific command) and may extract and store a count of the storage device resources 120 based on the storage device resource information H1. The storage device resource information H1 may include a total amount of, a usage of, an assignment of, and/or an availability of the storage device resources 120.

The resource manager RM may distribute the storage device resources 120 based on a QoS (or an SLA) of the virtual machines VM deployed on (e.g., loaded on) the host computer HC and may adjust (e.g., dynamically adjust) a distribution of the storage device resources 120 based on a change in the deployment of the virtual machines.

For example, when the hypervisor HV loads and/or unloads the first virtual machine VM1 or the second virtual machine VM2, the resource manager RM may calculate or recalculate an amount of the storage device resources 120 assigned to each respective virtual machine deployed on the host computer HC based on the QoS (or SLA) of each respective virtual machine VM loaded on the host computer HC.

The resource manager RM may determine an amount of the total storage device resources 120 to assign respectively to any number of virtual machines VM loaded onto the host computer HC based on a parameter corresponding to a service level (e.g., a relative service level) of each virtual machine (e.g., the service level parameters W1 and W2). The resource manager RM may partition (e.g., assign) the storage device resources 120 based on determining a resource allocation unit and an amount of assigned resources for the first virtual machine VM1 and/or the second virtual machine VM2 according to Equation 1 (above) and may update the first resource assignment information RAI1 and/or the second resource assignment information RAI2 provided to the first virtual machine VM1 and/or the second virtual machine VM2, based on loading or unloading the first virtual machine VM1 or the second virtual machine VM2. The resource manager RM may update the first resource assignment information RAI1 through the first resource agent RA1 and may update the second resource assignment information RAI2 through the second resource agent RA2. Accordingly, the resource manager RM may manage a dynamically provided distribution (e.g., a weighted share) of the storage device resources 120 for the system 1 based on a parameter (e.g., the service level parameters W1 and W2) corresponding to the relative service levels of the first virtual machine VM1 and the second virtual machine VM2.

In some embodiments, the resource manager RM may synchronize a resource utilization status by gathering resource utilization information through a resource agent and present a virtual machine's current resource utilization status to a user.

In some embodiments, to update the first resource assignment information RAI1 and/or the second resource assignment information RAI2, the resource manager RM may propagate a resource distribution format including a resource header, multiple tuples of device IDs, and a list of assigned resources. The resource header may include a data size and a number of tuples. The tuples may include a VF device ID, a number of resources, and a resource count. For example: Resource distribution format {128, 2, [VF device id (A), #resources, resource 1, . . . , resource N][VF device id (B), #resources, resource 1, . . . , resource N]}.

In some embodiments, the resource manager RM may manage a resource mapping of virtual devices for the virtual machines of the host computer HC. For example, the hypervisor HV may configure a weighted share (e.g., an SLA weight) for each virtual machine.

For example, the resource manager RM may propagate a resource distribution format, which may be built from SLA configuration data of the resource manager RM. The resource manager RM may configure an SLA weight of a virtual machine for a storage device tuple using the following resource distribution format: [PF device id, VM id, VF device id, SLA weight]. "PF device id" may represent a physical function PF device ID of the storage device, and "VF device id" may represent a virtual function VF storage device ID within the virtual machine VM corresponding to the PF device ID. For a given virtual machine ID ("VM id"), the resource manager RM may retrieve tuples having the same virtual machine ID from internal tables (e.g., the internal tables may include a database or a file stored on the host computer HC). Each tuple may include SLA weight and PF device ID information, which may be used by the resource manager RM for resource calculation (e.g., determining resource distribution).

Based on loading or unloading a virtual machine VM, the resource manager RM may calculate or recalculate a resource distribution (e.g., resource assignment information RAI) corresponding to the active virtual machines VM (e.g., the deployed virtual machines), may build a resource distribution format, and may propagate the resource distribution format to one or more resource agents corresponding to respective ones of all existing (e.g. currently deployed) virtual machines VM.

In some embodiments, the resource manager RM may retrieve I/O and resource status information through one or more resource agents RA of the host computer HC. For example, the I/O and resource status information (e.g., resource utilization information) may include resource collision statistics and I/O statistics for each virtual function VF device corresponding to a given virtual machine VM.

Communication between a resource manager RM and a resource agent RA may be provided by a communication mechanism (e.g., a protocol) such as Transmission Control Protocol/Internet Protocol (TCP/IP), User Datagram Protocol/Internet Protocol (UDP/IP), or Inter-Process Communication (IPC) (e.g., socket, message queue, etc.).

In some embodiments, the resource agents RA of the system 1 may be stand-alone applications that communicate with storage device drivers to set and/or update resource assignment information RAI and retrieve I/O statistics. Each resource agent RA may serve as an interface, between the resource manager RM and a traffic controller TC, through which I/O and resource status information may be received and sent (e.g., a given resource agent RA may communicate, or relay, information between a given virtual machine VM and the resource manager RM). For example, the first resource agent RA1 may set the first resource assignment information RAI1 and/or the first resource utilization information RUI1 by propagating (e.g., sending) it to the first traffic controller TC1. Likewise, the second resource agent RA2 may set the second resource assignment information RAI2 and/or the second resource utilization information RUI2 by propagating (e.g., sending) it to the second traffic controller TC2.

In some embodiments, traffic controllers TC may be provided at (e.g., in) storage device drivers of each of the respective virtual machines VM of the system 1. Each traffic controller TC may schedule I/O requests from a respective virtual machine VM based on the resource assignment information RAI provided by the resource manager RM. Each traffic controller TC may determine an amount of resources required for a given I/O request from a given virtual machine VM. Each traffic controller TC may track resource utilization information RUI and determine when the amount of resources required for the given I/O request is less than or equal to an amount of resources available to the given virtual machine VM based on the RAI and the resource utilization information RUI. When sufficient storage device resources 120 are available for the given I/O request, the traffic controller TC may push (e.g., send) the I/O request to a queue at the storage device resources 120 of the storage device 100. When the I/O request is completed, the storage device resources 120 allocated to the I/O request may be released to the traffic controller TC for allocating to subsequent I/O requests. When sufficient storage device resources 120 are not available (e.g., when there is a resource collision) for a given I/O request, the traffic controller TC may reschedule the given I/O request by pushing (e.g., sending) the given I/O request back to the software queues of the respective given virtual machine VM (e.g., the first or second software queue and I/O schedulers 320 or 420).

In some embodiments, each traffic controller TC may track and store resource I/O statistics (e.g., the first I/O statistic 310 and/or the second I/O statistics 410) and resource utilization information RUI (e.g., the first resource utilization information RUI1 and/or the second resource utilization information RUI2), which may include resource collision statistics, and report the I/O statistics and the resource utilization information to the resource manager RM through a respective resource agent RA (e.g., the first resource agent RA1 and/or the second resource agent RA2). Accordingly, users of the virtual machines VM may be presented with information corresponding to the I/O statistics and the resource utilization information RUI to determine whether an upgrade (or downgrade) with respect to a given service level may be suitable. For example, a user may decide to pay a higher price to achieve a higher level of service based on the information corresponding to the I/O statistics.

In some embodiments an amount of the storage device resources 120 assigned to a given virtual machine VM may be reserved for the given virtual machine VM and may not be available to other virtual machines VM on the host computer HC. Thus, a user of the given virtual machine VM may be guaranteed a weighted share of the storage device resources 120 that is proportional to a level of service selected by the user.

Because the setting and updating of resource assignment information RAI is event driven, distributed resource agents RA provided at each respective virtual machine VM allow for suitable communication of dynamic resource assignment information RAI and dynamic resource utilization information RUI between corresponding distributed traffic controllers TC and a centralized resource manager RM.

In some embodiments, a communication logic may be added inside a storage driver to provide for communication between a traffic controller TC and a resource manager RM. However, such embodiments may increase a complexity and reduce a modularity of a software architecture corresponding to the system 1. Contrastingly, embodiments employing resource agents RA between the resource manager RM and the traffic controllers TC may improve the software architecture by hiding a communication mechanism and an application programming interface API between the traffic controller TC and the resource manager RM.

An example scenario for handling an I/O request from a second virtual machine VM2 to a storage device 100 will be described with reference to FIG. 1 to further illustrate a resource-based I/O scheduling performed by a system 1, according to some embodiments of the present disclosure.

For example, a resource manager RM may load the second virtual machine VM2 onto the host computer HC and determine that the second virtual machine VM2 has a second parameter W2 that is equal to 1, based on a QoS (or an SLA) of the second virtual machine VM2. Accordingly, the resource manager RM may set a second resource assignment information to 1000 for the second virtual machine VM2 (e.g., based on the storage device resource information H1 received from the storage device 100).

A second filesystem 430 of the second virtual machine VM2 may send an I/O request to a second software queue and I/O scheduler 420 of the second virtual machine VM2. The second software queue and I/O scheduler 420 may send the I/O request to the traffic controller TC2.

The traffic controller TC2 may refer to the second resource assignment information RAI2 and determine that an amount of storage device resources 120 assigned to the second virtual machine VM2 is equal to 1000. The traffic controller TC2 may determine that an amount of storage device resources 120 required for the I/O request is equal to 10. The traffic controller TC2 may refer to the second resource utilization information RUI2 and determine that a current amount of storage device resources 120 consumed by other I/O requests from the second virtual machine VM2 is equal to 800 and that an amount of the storage device resources 120 available to the second virtual machine VM2 is equal to 200. Because the amount of storage device resources 120 required for the I/O request (e.g., 10) is less than the amount of the storage device resources 120 available to the second virtual machine VM2 (e.g., 200), the second traffic controller TC2 may determine that sufficient storage device resources 120 are available on the storage device 100 and may push (e.g., send) the I/O request to a storage queue corresponding to the storage device resources 120 assigned to the second virtual machine VM2.

The second traffic controller TC2 may update the second resource utilization information RUI2 to indicate that an amount of the storage device resources 120 consumed by the second virtual machine VM2 is equal to 810. The second traffic controller TC2 may update the second I/O statistics 410 to record a successful I/O request. When sufficient storage device resources 120 are not available to process a given I/O request from the second virtual machine VM2, the second traffic controller TC2 may update the second I/O statistics 410 to record a resource collision.

When the I/O request is completed, the storage device resources 120 required by the I/O request may be released and the second resource utilization information RUI2 may be updated to reflect that an amount of available storage device resources 120 for the second virtual machine VM2 has increased by 10.

The resource manager RM may load a first virtual machine VM1 having a first parameter W1 that is equal to 3 to the host computer HC. Accordingly, the resource manager RM may calculate the first resource assignment information RAI1 and recalculate the second resource assignment information RAI2, along with recalculating resource assignment information RAI for all other virtual machines VM on the host computer HC, based on each virtual machine's parameters (e.g., including the first parameter W1 and the second parameter W2).

For example, if the first virtual machine VM1 and the second virtual machine VM2 were the only virtual machines VM on the host computer HC and a total amount of storage device resources 120 were equal to 1000, the resource manager RM may apply Equation 1 (above) to update the first resource assignment information RAI1 to include an amount of assigned resources for the first virtual machine VM1 that is equal to 750 and may update the second resource assignment information RAI2 to include an amount of assigned resources for the second virtual machine VM2 that is equal to 250. For example, a resource allocation unit from Equation 1 may be equal to 1000/(1+3), which equals 250, an amount of assigned resources for the first virtual machine VM1 may be equal to 3×250, which equals 750, and an amount of assigned resources for the second virtual machine VM2 may be equal to 1×250, which equals 250.

The resource manager RM may send (e.g., forward) the updated resource assignment information RAI, including the first resource assignment information RAI1 and the updated second resource assignment information RAI2 to the respective resource agents RA (e.g., the first resource agent RA1 and the second resource agent RA2). The first resource agent RA1 may update the first resource assignment information RAI1 for the first traffic controller TC1 and the second resource agent RA2 may update the second resource assignment information RAI2 for the second traffic controller TC2.

Accordingly, the traffic controllers TC may apply (e.g., refer to) the updated resource assignment information RAI when determining whether sufficient storage device resources 120 are available to process a given I/O request from a given virtual machine VM.

Figure 2:
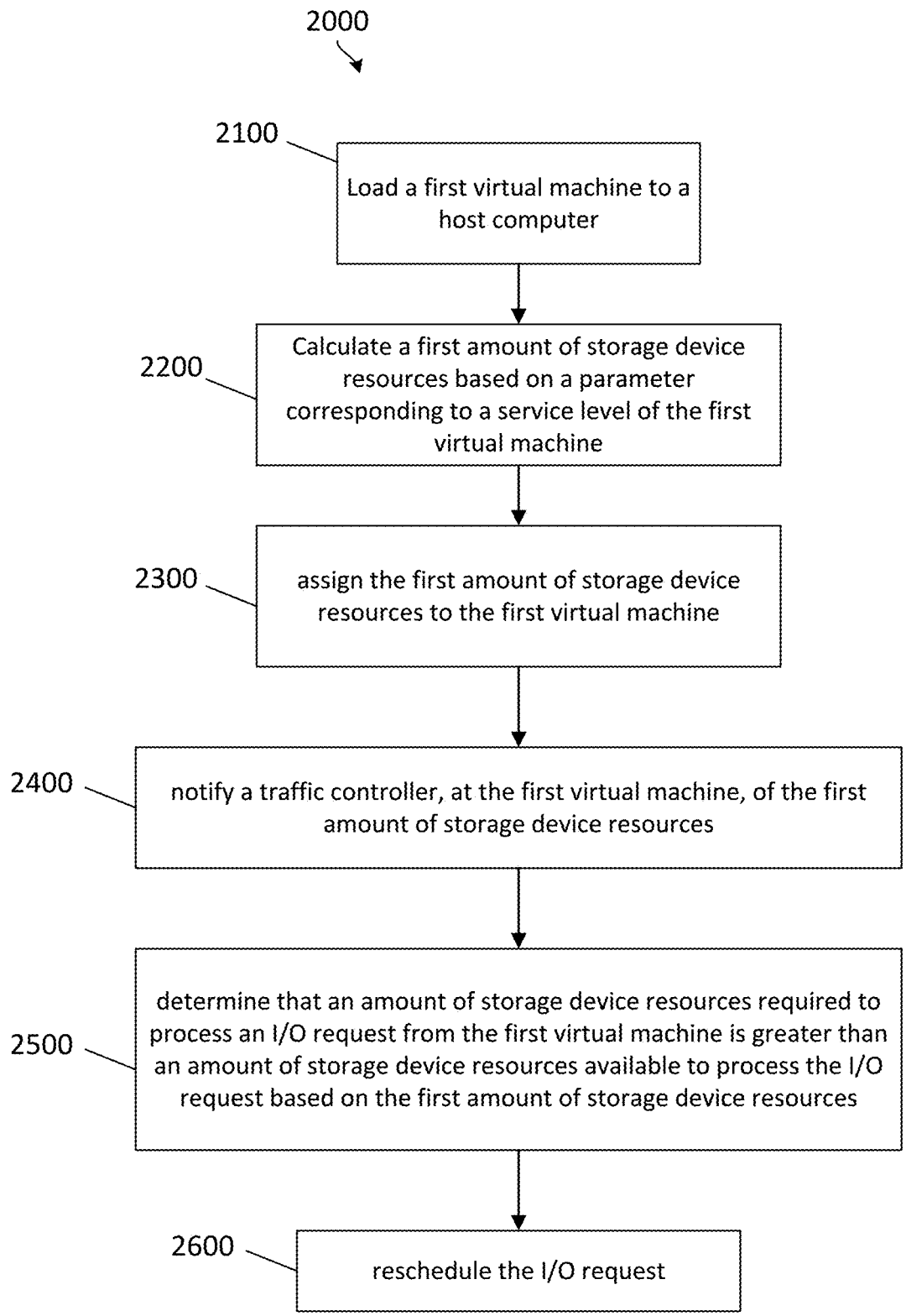
FIG. 2 is a flowchart depicting example operations of a method of scheduling I/O requests from virtual machines for the system of FIG. 1, according to some embodiments of the present disclosure.

FIG. 2 is a flowchart depicting example operations of a method of scheduling I/O requests from virtual machines for the system of FIG. 1, according to some embodiments of the present disclosure.

Referring to FIG. 2, a method 2000 of scheduling I/O requests from virtual machines may be performed by the system 1, wherein: a resource manager RM may load a virtual machine VM to a host computer HC (operation 2100); the resource manager RM may calculate a first amount of storage device resources 120 based on a parameter corresponding to a service level of the virtual machine VM (operation 2200); the resource manager RM may assign the first amount of storage device resources to the virtual machine VM (operation 2300); the resource manager RM may notify (e.g., via a resource agent RA of the virtual machine VM) a traffic controller TC, at the virtual machine VM, of the first amount of storage device resources 120 (operation 2400); the traffic controller TC may determine that an amount of storage device resources 120 required to process an I/O request from the virtual machine VM is greater than an amount of storage device resources 120 available to process the I/O request based on the first amount of storage device resources 120 (operation 2500); and the traffic controller TC may reschedule the I/O request (operation 2600).

Figure 3:
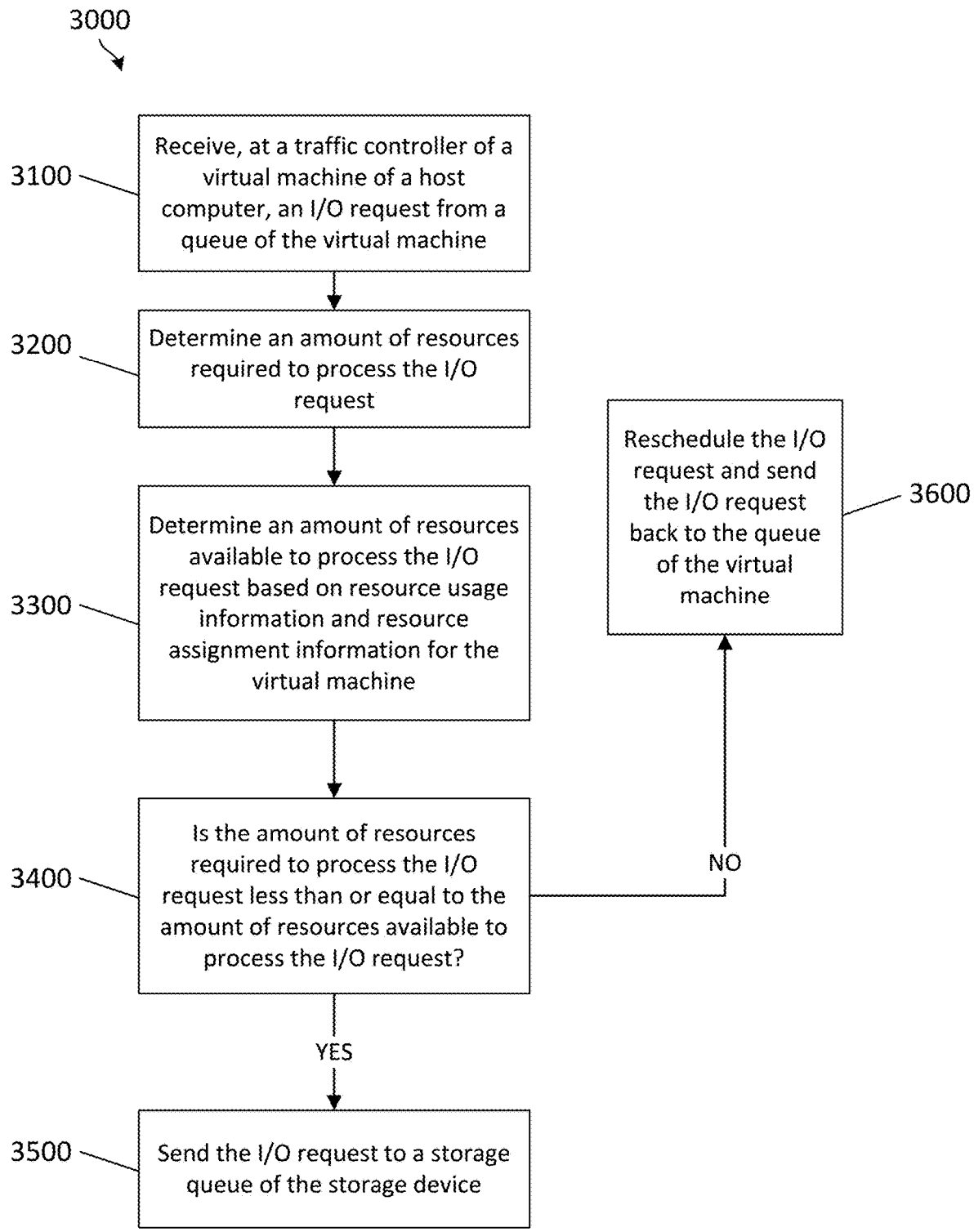
FIG. 3 is a flowchart depicting example operations of a method of scheduling an I/O request from a virtual machine based on an availability of assigned resources for the system of FIG. 1, according to some embodiments of the present disclosure.

FIG. 3 is a flowchart depicting example operations of a method of scheduling an I/O request from a virtual machine based on an availability of assigned resources for the system of FIG. 1, according to some embodiments of the present disclosure.

Referring to FIG. 3, a method 3000 of scheduling an I/O request from a virtual machine based on an availability of assigned resources may be performed by the system 1, wherein a traffic controller TC of a virtual machine VM may:

receive an I/O request from a queue of the virtual machine VM (operation 3100); determine an amount of storage device resources 120 required to process the I/O request (operation 3200); determine an amount of the storage device resources 120 available to process the I/O request, based on resource utilization (or usage) information and resource assignment information for the virtual machine (3300); determine whether the amount of storage device resources 120 required to process the I/O request is less than or equal to the amount of storage device resources 120 available to process the I/O request (operation 3400); based on determining that the amount of storage device resources 120 required to process the I/O request is less than or equal to the amount of storage device resources 120 available to process the I/O request, send the I/O request to a storage queue of the storage device corresponding to the storage device resources 120 available to the virtual machine VM (operation 3500); and, based on determining that the amount of storage device resources 120 required to process the I/O request is greater than the amount of storage device resources 120 available to process the I/O request, rescheduling the I/O request and sending the I/O request back to the queue of the virtual machine (operation 3600).

FIG. 4 is a flowchart depicting example operations of methods of communicating resource utilization information between a resource manager and a traffic controller of the system of FIG. 1, according to some embodiments of the present disclosure.

Referring to FIG. 4, a method 4000A of communicating resource utilization information between a resource manager RM and a traffic controller TC may be performed by the system 1, wherein: the resource manager RM of a host computer HC may send a request for resource utilization information RUI to a resource agent RA of a virtual machine VM (operation 4100A); the resource agent RA may send a request for a resource utilization report from the resource agent RA to a traffic controller TC of the virtual machine VM (operation 4200A); the traffic controller TC may send the resource utilization report to the resource agent RA (operation 4300A); the resource agent RA may extract the resource utilization information from the utilization report (operation 4400A); and the resource agent RA may send the utilization information to the resource manager RM (operation 4500A).

A method 4000B of communicating resource utilization information RUI between a resource manager RM and a traffic controller TC may be performed by the system 1, wherein: the traffic controller may send a resource utilization report to a resource agent of the virtual machine VM (operation 4100B); the resource agent RA may extract resource utilization information corresponding to a storage device 100 from the resource utilization report (operation 4200B); and the resource agent RA may send the utilization information to the resource manager RM of a host computer HC coupled to the storage device 100 (operation 4300B).

Accordingly, embodiments of the present disclosure provide improvements to virtualization in computer systems, such that storage device resources for processing I/O requests from virtual machines of a host computer may be more fairly distributed based on relative service levels of the virtual machines, resource conflicts may be avoided, latency may be reduced, and throughput may be increased.

While embodiments of the present disclosure have been particularly shown and described with reference to the embodiments described herein, it will be understood by those of ordinary skill in the art that various changes in form and details may be made therein without departing from the spirit and scope of the present invention as set forth in the following claims and their equivalents.

What is claimed is:

1. A system for scheduling input/output (I/O) requests from virtual machines, the system comprising:
a storage device comprising storage device resources for processing I/O requests to access a non-volatile memory of the storage device;
a first virtual machine configured to send an I/O request to the storage device;
a resource manager configured to calculate a first amount of the storage device resources and assign the first amount to the first virtual machine; and
a traffic controller associated with the first virtual machine, the traffic controller being configured to reschedule the I/O request from the first virtual machine based on an availability of the first amount.

2. The system of claim 1, further comprising a resource agent associated with the first virtual machine, the resource agent being configured to communicate, between the first virtual machine and the resource manager, resource assignment information, resource utilization information, or information corresponding to I/O statistics.

3. The system of claim 1, further comprising sending the I/O request from the first virtual machine to the storage device resources in accordance with a protocol that allows the I/O request to bypass a host software stack of the system.

4. The system of claim 3, wherein the protocol comprises a single root I/O virtualization (SR-IOV) protocol and the first virtual machine is configured to send the I/O request to the storage device via a virtual function of the first virtual machine.

5. The system of claim 1, wherein:
the storage device resources comprise hardware queues and hardware tokens to keep track of a command processing status of one or more I/O requests; and
the storage device is configured to send, to a host computer, a storage device resource information that is indicative of a total amount of the storage device resources.

6. The system of claim 1, wherein the resource manager calculates the first amount based on a storage device resource information, a parameter corresponding to a service level of the first virtual machine, and a parameter associated with a loading of the first virtual machine onto the system.

7. The system of claim 6, further comprising recalculating, by the resource manager, the first amount based on a parameter associated with a loading or an unloading of a second virtual machine onto the system.

8. The system of claim 1, wherein the resource manager calculates the first amount based on a relative service level weight of the first virtual machine, a resource allocation unit, a total amount of the storage device resources, and a relative service level weight of a second virtual machine associated with the system.

9. The system of claim 1, wherein the traffic controller tracks a resource collision statistic corresponding to the rescheduling of the I/O request from the first virtual machine.

10. The system of claim 9, wherein the traffic controller is configured to report information corresponding to the resource collision statistic to the resource manager.

11. A method of scheduling input/output (I/O) requests from virtual machines, the method comprising:
loading a first virtual machine to a system;
calculating, by a resource manager, a first amount of storage device resources;

assigning, by the resource manager, the first amount to the first virtual machine;

notifying a traffic controller, associated with the first virtual machine, of the first amount;

determining that an amount of storage device resources required to process an I/O request from the first virtual machine is greater than an amount of storage device resources available to process the I/O request based on the first amount; and rescheduling, by the traffic controller, the I/O request.

12. The method of claim 11, wherein the notifying the traffic controller comprises notifying a resource agent associated with the first virtual machine, the resource agent being configured to communicate, between the first virtual machine and the resource manager, resource assignment information, resource utilization information, or information corresponding to I/O statistics.

13. The method of claim 11, further comprising sending the I/O request to the storage device resources based on determining that the amount of storage device resources required to process the I/O request is less than or equal to the amount of storage device resources available to process the I/O request, wherein the storage device resources comprise one or more queues for processing I/O requests to access a non-volatile memory of a storage device, and wherein the first virtual machine is configured to send the I/O request to the storage device in accordance with a protocol that allows the I/O request to bypass a host software stack of the system.

14. The method of claim 13, wherein the protocol comprises a single root I/O virtualization (SR-IOV) protocol and the first virtual machine is configured to send the I/O request to the storage device via a virtual function of the first virtual machine.

15. The method of claim 11, wherein the resource manager calculates the first amount based on a storage device resource information, a parameter corresponding to a service level of the first virtual machine, and parameter associated with a loading of the first virtual machine onto the system.

16. The method of claim 15, further comprising recalculating, by the resource manager, the first amount of storage device resources assigned to the first virtual machine based on a parameter associated with a loading or a parameter associated with an unloading of a second virtual machine onto the system.

17. The method of claim 11, wherein the resource manager calculates the first amount of storage device resources based on a relative service level weight of the first virtual machine, a resource allocation unit, a total amount of storage device resources, and a relative service level weight of a second virtual machine associated with the system.

18. The method of claim 11, further comprising tracking, by the traffic controller, a resource collision statistic corresponding to the rescheduling of the I/O request.

19. A system comprising:
a host computer; and
a non-transitory computer readable medium,
the non-transitory computer readable medium being implemented on the host computer and having computer code that, when executed on a processor, implements a method of scheduling input/output (I/O) requests from virtual machines, the method comprising:
loading a first virtual machine to the system;
calculating, by a resource manager, a first amount of storage device resources;
assigning, by the resource manager, the first amount to the first virtual machine;
notifying a traffic controller, associated with the first virtual machine, of the first amount;
determining that an amount of storage device resources required to process an I/O request from the first virtual machine is greater than an amount of storage device resources available to process the I/O request based on the first amount; and
rescheduling, by the traffic controller, the I/O request.

20. The system of claim 19, wherein the notifying the traffic controller comprises notifying a resource agent associated with the first virtual machine, the resource agent being configured to communicate, between the first virtual machine and the resource manager, resource assignment information, resource utilization information, or information corresponding to I/O statistics.

* * * * *